United States Patent
Abbas et al.

(10) Patent No.: US 10,095,635 B2
(45) Date of Patent: Oct. 9, 2018

(54) SECURING INFORMATION RELATING TO DATA COMPRESSION AND ENCRYPTION IN A STORAGE DEVICE

(71) Applicant: Seagate Technology LLC, Cupertino, CA (US)

(72) Inventors: Syed Yasir Abbas, Sinagapore (SG); Jeetandra Kella, Singapore (SG); William Erik Anderson, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 198 days.

(21) Appl. No.: 15/084,222

(22) Filed: Mar. 29, 2016

(65) Prior Publication Data

US 2017/0286319 A1    Oct. 5, 2017

(51) Int. Cl.
*G06F 21/62* (2013.01)
*G06F 12/14* (2006.01)
*G06F 3/06* (2006.01)

(52) U.S. Cl.
CPC .......... *G06F 12/1408* (2013.01); *G06F 3/068* (2013.01); *G06F 3/0623* (2013.01); *G06F 3/0659* (2013.01); *G06F 3/0676* (2013.01); *G06F 3/0679* (2013.01); *G06F 21/62* (2013.01); *G06F 2212/1052* (2013.01); *G06F 2212/401* (2013.01); *G06F 2212/402* (2013.01)

(58) Field of Classification Search
CPC .......... G06F 3/06; G06F 3/062; G06F 3/0622; G06F 3/0623; G06F 3/0656; G06F 3/068; G06F 12/1408; G06F 21/00; G06F 21/44; G06F 21/60; G06F 21/602; G06F 21/70; G06F 21/78; G06F 2212/40; G06F 2212/401; G06F 2212/402; G06F 2212/1052

See application file for complete search history.

(56) References Cited

U.S. PATENT DOCUMENTS 5,375,243 A    12/1994  Parzych et al.
5,548,724 A     8/1996  Akizawa et al.
(Continued)

OTHER PUBLICATIONS

J. Kelsey, "Compression and Information Leakage of Plaintext," (2002), http://www.iacr.org/cryptodb/archive/2002/FSE/3091/3091.pdf.

*Primary Examiner* — Eric W Shepperd
(74) *Attorney, Agent, or Firm* — Hall Estill Attorneys at Law

(57) ABSTRACT

Apparatus and method for data security in a data storage environment. In some embodiments, input data from a host is received into a buffer memory. Data compression is applied to the input data to provide compressed data. Encryption is applied to the compressed data to generate encrypted data, and the encrypted data are stored in a main memory of a data storage device. A system parameter value associated with the storage of the encrypted data is generated and stored in a memory, such as the main memory of the storage device. The system parameter value may include information relating to the compression of the data. A trusted relationship is established to authenticate the host responsive to a request for the updated system parameter value. The system parameter value is transferred to the host responsive to the established trusted relationship.

18 Claims, 5 Drawing Sheets

(56) References Cited

U.S. PATENT DOCUMENTS

| | | | |
|---|---|---|---|
| 5,799,145 A | 8/1998 | Imai et al. | |
| 5,805,800 A | 9/1998 | Kotani et al. | |
| 6,167,438 A * | 12/2000 | Yates | G06F 17/30902 707/E17.12 |
| 6,275,599 B1 | 8/2001 | Adler et al. | |
| 6,278,913 B1 * | 8/2001 | Jiang | G07C 5/0858 244/158.1 |
| 6,550,021 B1 | 4/2003 | Dalphy et al. | |
| 6,597,812 B1 * | 7/2003 | Fallon | H03M 7/3088 341/51 |
| 6,820,177 B2 | 11/2004 | Poisner | |
| 7,337,214 B2 | 2/2008 | Douglass et al. | |
| 7,653,197 B2 | 1/2010 | Van Dijk | |
| 7,779,416 B2 | 8/2010 | Koga et al. | |
| 7,788,717 B2 | 8/2010 | Merkin | |
| 7,933,905 B2 | 4/2011 | Obana et al. | |
| 8,230,190 B1 | 7/2012 | Cheok et al. | |
| 8,250,648 B2 | 8/2012 | Kabzinski et al. | |
| 8,375,206 B2 | 2/2013 | Asano et al. | |
| 8,397,051 B2 | 3/2013 | Beaman et al. | |
| 8,423,604 B2 | 4/2013 | Johnson | |
| 8,566,603 B2 | 10/2013 | Cox et al. | |
| 8,914,706 B2 | 12/2014 | Anderson | |
| 9,449,007 B1 * | 9/2016 | Wood | G06F 17/3012 |
| 2005/0195975 A1 * | 9/2005 | Kawakita | H04L 9/0822 380/30 |
| 2007/0180210 A1 | 8/2007 | Thibadeau | |
| 2008/0104387 A1 | 5/2008 | Owhadi et al. | |
| 2011/0055664 A1 * | 3/2011 | Burd | G06F 3/0608 714/768 |
| 2011/0078512 A1 * | 3/2011 | Grube | G06F 11/10 714/42 |
| 2013/0174250 A1 | 7/2013 | Chen | |
| 2014/0108786 A1 * | 4/2014 | Kreft | G06F 21/71 713/156 |
| 2014/0259153 A1 * | 9/2014 | Le | G06F 21/31 726/19 |
| 2015/0019875 A1 | 1/2015 | Barbiero et al. | |
| 2015/0067339 A1 * | 3/2015 | Paris | H04L 9/0637 713/171 |
| 2015/0372807 A1 * | 12/2015 | Khoyi | H04L 63/04 713/150 |

* cited by examiner

ENCRYPTION

METADATA

| HEADER | ADDRESS INFORMATION | LBAs | FORWARD POINTERS |

STATE DATA

| COMPRESSION USE | COMPRESSION TYPE |
| AVAILABLE FREE SPACE | DATA BLOCK SIZES |
| ENCRYPTION PARAMETERS | AUTHENTICATION DATA |
| VERSION DATA | METADATA |

SECURING INFORMATION RELATING TO DATA COMPRESSION AND ENCRYPTION IN A STORAGE DEVICE

SUMMARY

Various embodiments of the present disclosure are generally directed to an apparatus and method for data security in a data storage environment.

In some embodiments, data compression is applied to the input data to provide compressed data. Encryption is applied to the compressed data to generate encrypted data, and the encrypted data are stored in a main memory of a data storage device. A system parameter value associated with the storage of the encrypted data is generated and stored in a memory, such as the main memory of the storage device. A trusted relationship is established to authenticate the host responsive to a request for the updated system parameter value. The system parameter value is transferred to the host responsive to the established trusted relationship.

In other embodiments, a data storage device includes a non-volatile main memory and a controller circuit. The controller circuit is configured to receive input data from a host into a buffer memory, apply data compression to the input data to provide compressed data, encrypt the compressed data using an encryption key to generate encrypted data, store the encrypted data in the main memory, generate and store in a memory a system parameter value associated with the storage of the encrypted data, establish a trusted relationship to authenticate the host responsive to a request for the updated system parameter value, and transfer the updated system parameter value to the host responsive to the established trusted relationship. The system parameter value includes a compression parameter associated with the compression of the input data.

In further embodiments, an apparatus has a plurality of data storage devices arranged to form a multi-device memory space and a controller circuit configured to transfer data between the memory space and a host device. The controller circuit operates by applying data compression to input data received from the host to provide compressed data, encrypting the compressed data using an encryption key to generate encrypted data, storing the encrypted data in the main memory, and generating and storing in a memory a system parameter value associated with the storage of the encrypted data, the controller circuit further configured to, responsive to a request from the host for the system parameter value, establish a trusted relationship with the host and to transfer the updated system parameter value to the host responsive to the established trusted relationship.

These and other features and advantages of various embodiments can be understood by a review of the following detailed description in conjunction with the associated drawings.

DETAILED DESCRIPTION

Figure 1:
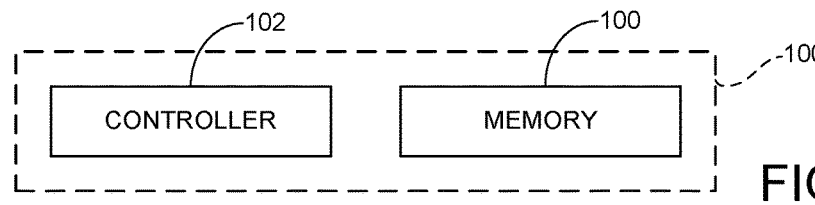
FIG. 1 is a functional representation of a data storage device constructed and operated in accordance with various embodiments.

The present disclosure generally relates to data security in a data storage environment.

Data security schemes can be used in a computerized data storage and communication system to reduce unauthorized parties from gaining access to the underlying content of confidential data stored and/or transmitted by the system. Such schemes can include the use of data encryption, authorization codes, password systems, digital fingerprints, biometric identification systems, etc. in an effort to authenticate access to the underlying data.

An effective data security scheme prevents or severely limits direct attacks by third parties to gain access to the underlying data stored in the system. Nevertheless, such schemes can be less efficient in preventing side-channel attacks along information leakage channels that may exist in the system. An information leakage channel can be thought of as a stream of information that "leaks" from a system that provides attackers with valuable knowledge associated with the underlying data. Such information can take a variety of forms such as when data sets are generated/stored/transferred, the sizes of particular data sets, the originator/owner of data sets, whether encryption or other data processing techniques have been applied, and so on.

One source of information leakage in modern data storage systems relates to the use of data compression. As will be appreciated, data compression is a data encoding technique whereby the overall size of a digital data set is reduced in size to save on storage and transmission requirements. A common data compression technique involves encoding an input string of data as recurring patterns along with an index notation indicating the number of times the pattern repeats in the sequence. A compressed data set (e.g., a compressed file) is decompressed, or expanded, to return the same or similar data set. A compression ratio value (also sometimes referred to as the compression power) can be used to describe the effectiveness of the compression algorithm; for example, a compression ratio of 80% indicates the compressed file is 80% of the size of the original file, and so on.

Data compression techniques can be lossless or lossy. Lossless data compression fully restores the originally compressed data set on an individual bit basis and should be used on certain types of data sets where each individual bit in the original data set needs to be recovered (e.g., a word processing document, a computer program, etc.). Lossy data compression may result in some loss of information once a compressed file is decompressed, and can be suitable for certain types of data sets such as audio/visual works where small bit changes will not affect the overall data set. The well known MP3 compression standard is an example of a lossy compression scheme.

The presence, use and efficiency of a compression scheme can leak a great deal of information to an attacker. To provide a concrete example, an encrypted and compressed stream of video frames from a security camera would be expected, under steady state conditions, to produce uniformly small data packets at a given rate based on well known video compression techniques where only changes from one frame to the next are transmitted. If a localized increase in the sizes of the packets was detected, this could be interpreted as a significant change in the field of view of the camera; that is, someone or something has changed the field of view significantly enough to require additional bits to describe the field of view. This information can be readily detected even if the actual signal (e.g., the actual video frames) are encrypted and cannot be decoded and viewed.

Information leakage can also be obtained based upon knowledge of the underlying data compression that has been applied to a set of data. For example, detecting the compression ratio value for a compressed data set can leak significant amounts of information that could lead, for example, to the identification of the type of the data file as well as the content that is described thereby.

As a rule, data compression and encryption are often difficult to implement in the same system. The general goal of an encryption system is to remove useful patterns from the data to present substantially white noise data with very high entropy (variation). By contrast, compression requires the presence of repeating patterns of data in order to compress the data set. Stated another way, an effectively encrypted data set would not be compressible since there would not be any available repeating patterns of significance in the encrypted data. Hence, if both data encryption and data compression are desired to be applied to a particular data set, compression should be performed first, followed by the encryption of the compressed data set.

Another problem with regard to providing information leakage paths is that, as greater amounts of signal processing are applied to a particular set of data, it generally follows that greater amounts of control data (e.g., metadata, state data, etc.) need to be generated as well to describe the underlying user data. If a data set is subjected to both compression and encryption, the systems used to store and handle the data need to have access to the type(s) of compression and the type(s) of encryption that have been applied to the data in order for such systems to be able to reliably recover the original uncompressed and unencrypted data set. Failure to adequately protect the control data can allow an otherwise secure system to leak significant information to an attacker.

Accordingly, various embodiments of the present disclosure are directed to an apparatus and method for securing data in a data storage system. As explained below, some embodiments provide a system that receives input data from a host into a buffer memory of a data storage device. Data compression is applied to the input data to provide compressed data. The compression process may be lossless or lossy depending on the type of data. Other encoding processing may be applied to the data as well.

The compressed data are encrypted using an encryption algorithm to generate encrypted data. The encrypted data are stored in a main memory of the data storage device, along with at least one system parameter value associated with the storage of the encrypted data. The system parameter value(s) can take a variety of forms depending on the requirements of a given application, but generally may include information regarding the compression process, information regarding the encryption process, and information regarding the underlying data (e.g., logical addresses, types of data, state values, data owner, etc.).

The system operates to protect the system parameter value(s) using a variety of techniques. These techniques can include data security protocols to ensure that only authorized entities can access the system parameter value(s). In some embodiments, access to the updated system parameter value(s) requires establishment of a trusted relationship responsive to a request for a transfer of an updated system parameter value, and an updated system parameter value is transferred responsive to the established trusted relationship. The associated data set can thereafter be transferred and decoded (e.g., application of data decompression and/or data decryption) as required.

Further embodiments provide the combination of multiple blocks of data that have been subjected to a compression process into a larger packet. To the extent necessary, filler bits may be appended to the end of the packet to make the packet reach a specified total capacity. Corresponding system parameter value(s) data associated with the packet are also protected by the foregoing types of security protocols.

In this way, data sets can be efficiently stored and transferred within a particular data storage system, such as a distributed data storage system (e.g., a cloud computing environment). Entities such as data owners or data stewards can be provided with the necessary mechanisms to enable the data to be partially or fully decoded in order to facilitate such storage and transfer operations.

These and other features of various embodiments can be understood beginning with a review of FIG. 1 which provides a simplified functional block diagram for a data storage device 100. The device 100 includes a controller (control circuit) 102 and a memory 104.

The controller 102 can take a variety of forms such as a programmable processor or hardware circuit to provide top level control functions for the device 100 as it stores and retrieves user data from a host device (not shown). The memory 104 can take any number of suitable forms such as but not limited to solid-state semiconductor memory (e.g., flash memory), rotatable storage discs (e.g., magnetic recording media), etc. In some cases, multiple memory types may be included in the memory 104. In other cases, a multi-device storage array may be made up of multiple individual storage devices, such as hard disc drives (HDDs), hybrid data storage devices (HDSDs), solid state drives (SSDs), etc.

Figure 2:
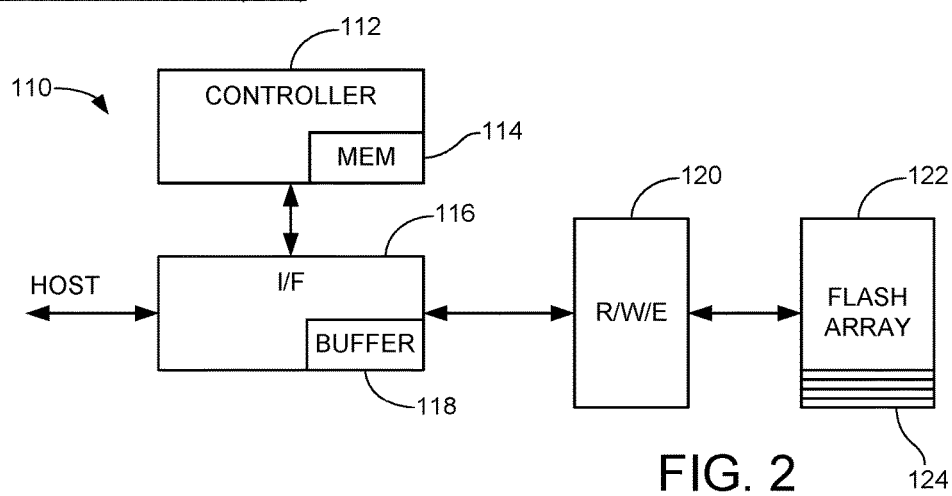
FIG. 2 shows the device of FIG. 1 characterized as a solid state drive (SSD).

FIG. 2 shows an arrangement of a data storage device 110 similar to the device 100 of FIG. 1. The data storage device 110 is characterized as an SSD. A controller 112 utilizes programming stored in a local memory 114 to execute various data transfer functions. An interface (I/F) circuit 116 communicates with a host device and includes a buffer memory 118 to temporarily store data being transferred between the host and the device.

A read/write/erase (R/W/E) circuit 120 provides data conditioning required to store and retrieve data with a flash memory array 122. The flash memory array 122 may include a number of pages 124 of memory to which blocks of data of selected size (such as 4 kilobytes, KB or 8 KB, etc.) are stored.

Figure 3:
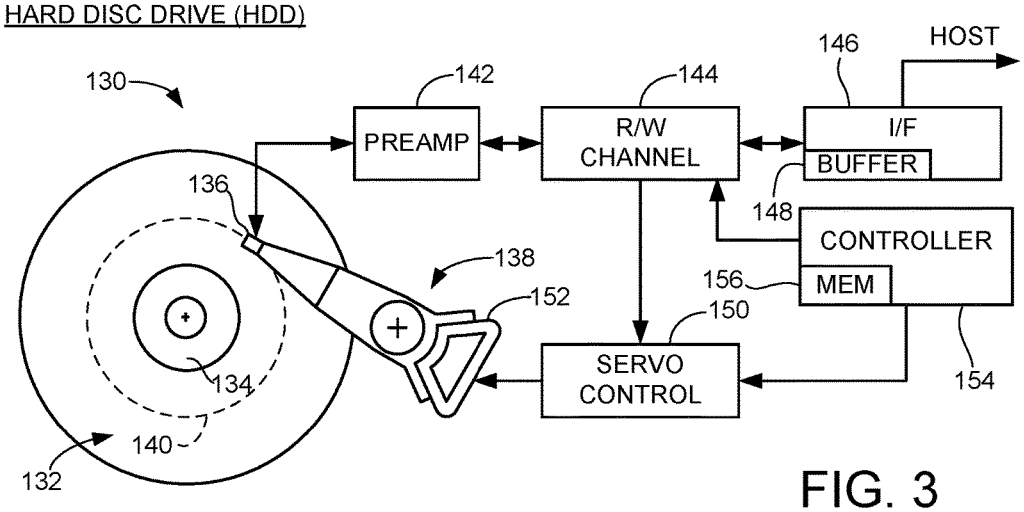
FIG. 3 shows the device of FIG. 1 characterized as a hard disc drive (HDD).

FIG. 3 shows an arrangement of another data storage device 130 similar to the device of FIG. 1. The device 130 in FIG. 3 is characterized as an HDD. One or more rotatable magnetic recording media (discs) 132 are rotated at a high speed by a spindle motor 134. Data read/write transducers (heads) 136 are radially moved across the disc surfaces using a rotary actuator 138 to write data to and read data from tracks 140 defined on the disc surfaces.

Data are transferred between the discs 132 and the host using a preamplifier/driver (preamp) circuit 142, a read/write (R/W) channel 144 and an I/F circuit 146 with data buffer 148. A servo control circuit 150 provides control inputs to a voice coil 152 to position the transducers 136 adjacent the tracks 140. Top level control of the HDD 130 is supplied by a controller 154 characterized as a programmable processor that uses programming stored in controller memory 156.

At this point it will be appreciated that the various embodiments of the present disclosure operate in a number of different storage devices including but not limited to the exemplary SSD 110 of FIG. 2 and the exemplary HDD 130 of FIG. 3, as well as multi-device systems that may be made up of multiple SSDs, HDDs and/or other forms of data storage. For example, a hybrid data storage device (HDSD) can be formed by combining solid state semiconductor memory such as from FIG. 2 with rotatable storage media as in FIG. 3 to provide a hybrid storage device with multiple forms of non-volatile storage to store user data. Received user data can accordingly be moved between the rotatable storage and solid state memory as required to enhance host data I/O rates.

Figure 4:
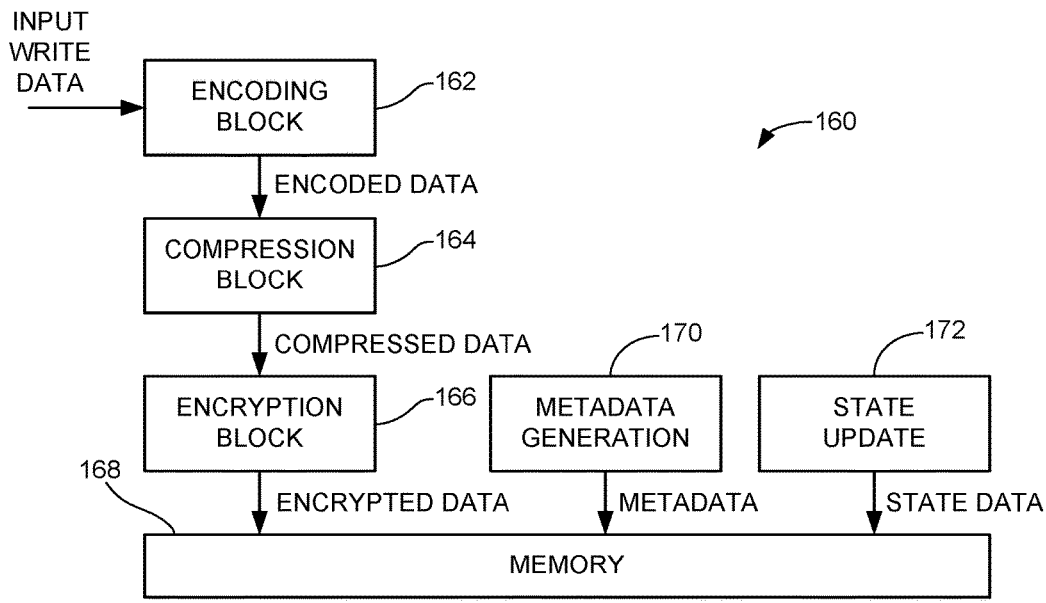
FIG. 4 shows operational circuits of the various storage devices of FIGS. 1-3 to process data in accordance with some embodiments.

FIG. 4 illustrates a processing circuit 160 that can be used to process data in accordance with some embodiments. The circuit 160 can be realized in the controller circuitry of FIGS. 1-3 or elsewhere in a data storage system. It will be appreciated that other arrangements of operational blocks can be used, including additional blocks, blocks in different ordering in the sequence, etc. Each of the blocks in FIG. 4 corresponds to a hardware and/or programmable circuit of the associated storage device.

An encoding block 162 applies certain types of encoding to input write data, such as error correction codes (ECC). A compression block 164 applies data compression techniques to the encoded data from block 162. An encryption block 166 applies encryption to the compressed data from block 164, and the encrypted data are written to memory 168 (such as the flash memory 120 in FIG. 2, the rotatable media 132 in FIG. 3, etc.).

Concurrent with the processing of the input user data, a metadata generation block 170 generates metadata associated with the storage of the data to the memory 168, and a state update block 172 generates updated state data for the data. The encrypted data, metadata and state data may be written to suitable locations in the memory. In some cases, the metadata and the state data may be encrypted using an encryption block such as 166. Controlled access to the metadata and the state data will be discussed below.

Figure 5:
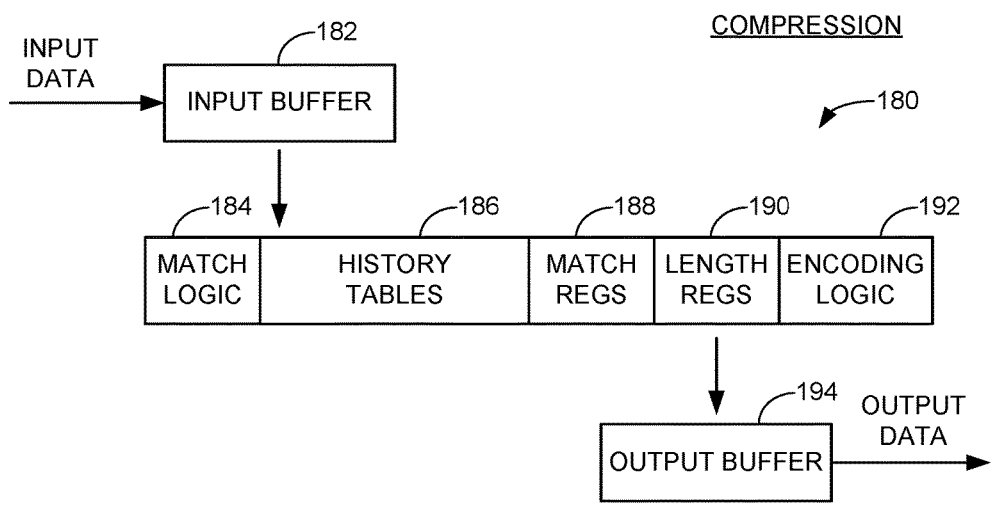
FIG. 5 illustrates a data compression sequence carried out in accordance with some embodiments.

FIG. 5 depicts a data compression sequence 180 carried out by the compression block 164 of FIG. 4 in some embodiments. Input data are temporarily stored in an input buffer 182. Match logic circuitry 184 searches for recurring bit patterns within the input data set as it streams through the buffer 182. History tables 186 such as in the form of one or more content addressable memories (CAMs) are used to provide a history buffer of the input data. The CAM depth (number of entries in the CAM) can be any suitable length, such as 1024 entries, 4096 entries, etc. A larger number of entries in the CAM can provide better compression performance since there will be a larger number of possible matches based on previously occurring entries.

The CAM width (number of bits in each entry) can be any suitable chunk size of the input data. In the present example, each chunk will constitute an 8-bit byte of the input data. Other sizes of chunks of data can be selected as desired (e.g., 2-bytes, 4-bytes, 12 bits, etc.). Smaller CAM widths can promote better compression performance since fewer numbers of bits tend to provide higher numbers of matches.

The input bytes are successively added as CAM entries in an incrementally increasing fashion beginning at address 0 (first entry of the CAM). Once the CAM is full, further entries overwrite the previously stored data beginning at address 0 to provide a rolling history. Other types of associative memories can be utilized to form the history buffer besides a CAM structure.

CAMs and other associative memories are configured to allow a simultaneous search of all stored entries via one or more match lines over a single clock cycle, irrespective of CAM depth. The match logic 184 facilitates multiple byte (chunk) match operations on the history buffer entries during the same clock cycle. Match registers (regs) 188 are used to record matches between the input bytes and the history buffer entries. Length registers 190 record lengths of strings of consecutive matches.

The match and length registers 188, 190 each may have a depth equal to the depth of the associated CAM 186. Encoding logic 192 operates to utilize the information recorded in the match and length registers 188, 190 to provide the output compressed data, which may be in the form of L(A)I(B), where L(A) is a literal (input multi-bit character A) and I(B) is an index value signifying there are B successive occurrences of the pattern A in the string.

The output compressed stream is provided to output buffer 194, which forwards the compressed data to the next downstream processing block (e.g., encryption block 166, FIG. 4). The output data rate nominally matches the input data rate, although in some embodiments the output rate may differ from the input data rate.

Figures 6, 7, 8:
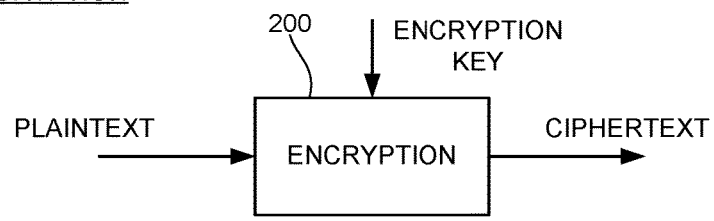
FIG. 6 shows an encryption circuit arranged to perform data encryption in accordance with some embodiments.
FIG. 7 is an exemplary format for metadata associated with data processed in accordance with FIGS. 5-6.
FIG. 8 shows control (state) data associated with data processed in accordance with FIGS. 5-6.

FIG. 6 illustrates an encryption engine circuit 200 of the encryption block 166 of FIG. 4. Generally, input data referred to as plaintext is transformed via a selected encryption algorithm to generate output ciphertext. An encryption key is a specially configured input that governs the data transformation process. A symmetrical encryption process enables the ciphertext to be presented as an input to the encryption engine 200 along with the key to produce the original plaintext.

A variety of encryption methodologies are known in the art and can be utilized in accordance with various embodiments. In some cases the encryption algorithm may be a counter (CTR) mode type encryption mechanism that utilizes a counter that in incremented each time plaintext is encrypted. An advantage of CTR mode is that if the counter continuously increments without repeat, the same plaintext provides a different ciphertext output each time. Thus, if the same input data are provided for storage to the same page over and over, a different bit pattern in the encrypted output data would be written each time. This is referred to herein as a non-repetitive encryption process.

Block encryption modes provide enhanced security over CTR, such as cipher block chaining (CBC) and XTS mode (XOR/Encryption/XOR based encryption with ciphertext stealing). CBC mode generally involves a chaining operation in which a previous block of ciphertext is logically combined with a current block of plaintext prior to an encryption operation. XTS mode is a tweakable block cipher such as described by IEEE 1619 and which employs a tweak to encrypt sequentially streamed blocks of plaintext.

While providing data security, these and other block modes generally operate to provide the same output ciphertext for a given set of input plaintext. Thus, if the same input data are provided for storage to the same page over and over, the same bit pattern in the encrypted output data would be written each time. This is referred to herein as a repetitive encryption process.

FIG. 7 provides an exemplary format for metadata 210 that may be generated concurrently with the encoding of input data by, for example, the metadata generation block 170 of FIG. 4. Metadata may be viewed as a type of control data that links logical addressing associated with the input data to physical addressing resident within the storage system. The exemplary metadata 210 includes a header portion, address information, LBAs and one or more forward pointers.

The header can supply necessary information to the system to enable access of the metadata. The address information can supply physical address locations within the memory (e.g., a particular page in the SSD 110 of FIG. 2 or a particular data sector on a selected track in the HDD 130 of FIG. 3). The LBA field (logical block address) can provide logical addressing for the blocks of data as identified by the host device. The forward pointers can be used to link previous versions of data to enable the system to search for and locate the most current version of data in the system. This latter feature is particularly suitable for erasure based systems such as flash where a new version of data is written to a new location rather than overwriting the data in the same location.

FIG. 8 shows an arrangement 220 for state data generated by the state update block 172 in accordance with some embodiments. The state data in FIG. 8 are merely exemplary and can take a variety of forms depending on the system. It is contemplated that the state data (or control data) are descriptor data sets to enable the system to manage the storage and transfer of an associated user data set. Granularity of the state data can be selected as desired, including individual blocks (sectors), pages, multi-sector blocks, RAID data sets, object storage partitions, etc.

Exemplary state data may include the presence (use) and type of data compression applied to the associated data set; the available free space in a given volume allocated to the storage of the data set; various data block sizes, encryption parameters (including type of encryption, encryption keys, seeds, counter values, etc.); authentication data parameters used to facilitate access to the state data (and in some cases the associated data set); version data associated with the data set; and in some cases, the metadata used by the system for the data set. Other state data may include the listing of owners of the data set (and authorized parties), time/date stamp information regarding the storage of the data, and so on.

As noted above, these and other forms of data may be encrypted, stored in one or more specially configured access controlled storage locations, etc. in an effort to prevent discovery and access by an attacking party, since the state data could provide an information leakage channel to an attacker. For example, knowledge concerning the use of compression or how much remaining space is available after the compression operation (e.g., allowing inference of compression ratio) could provide the attacker with valuable knowledge regarding the associated data. Similarly, the encryption parameters, version of the data and metadata could enable a motivated attacker to enhance a data attack on the underlying security scheme protecting the data.

Figure 9:
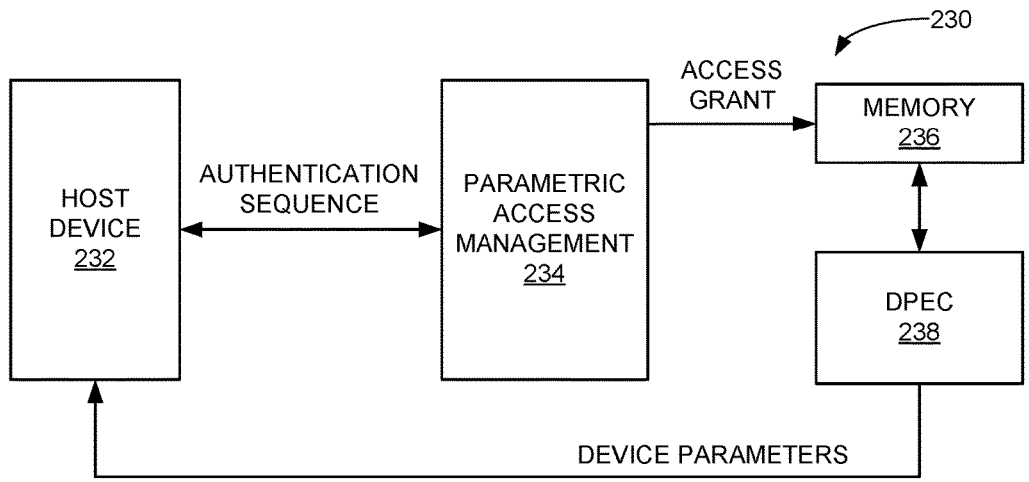
FIG. 9 illustrates an authentication system used to grant access to the state data of FIG. 8.

Accordingly, FIG. 9 provides a functional block diagram of a security system 230 constructed and operated in accordance with some embodiments to protect a storage system formed of data storage devices such as in FIGS. 1-3. A host device is represented at 232. A parametric access management circuit is represented at 234. A memory is shown at 236 and a device parameter extraction circuit is depicted at 238. The parametric access management circuit 234 may be incorporated in one or more of the storage devices (e.g., 110, 130) in the memory, in the host device 232, or may be a separate control module such as a storage server, controller board in a multi-device storage enclosure, etc. It is contemplated that the memory 236 and the device parameter extraction circuit 238 are incorporated into the individual data storage device being accessed.

Generally, the parametric access management circuit 234 operates to control access to the state data that describes the user data sets in the memory 236. Generally, an authentication sequence is carried out between the host device 232 and the management circuit 234. If successful, the management circuit 234 enables access (via an access grant command or status) to the memory 236, allowing the state data to be forwarded to the requesting device (host device 232) by the device parameter extraction circuit 238.

Figure 10:
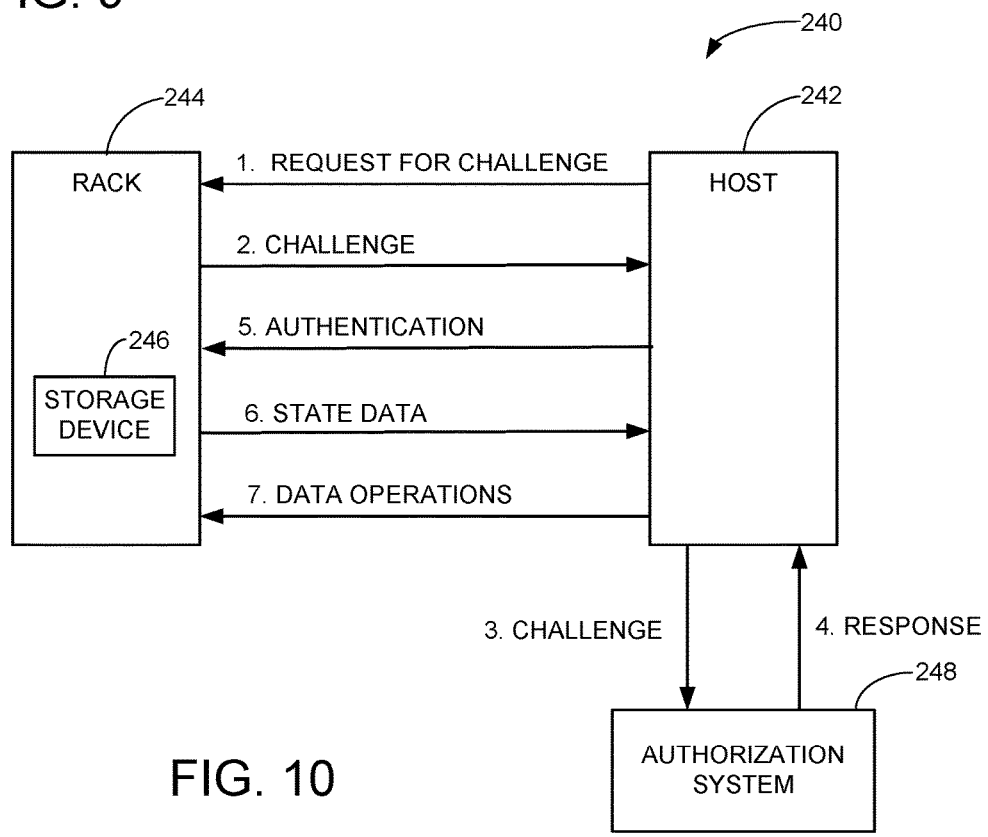
FIG. 10 is an authentication sequence useful in granting access to the state date of FIG. 8 using the system of FIG. 9 in accordance with some embodiments.

It is contemplated that the authentication sequence will commence with some sort of access command being issued by the requesting host 232 for access to the data. Any number of data authentication schemes can be employed as desired. FIG. 10 shows one such authentication scheme 240 that involves the use of challenge values. Other systems, such as password based systems, biometric or token based systems, etc. can be used as desired.

As shown by FIG. 10, a requesting host device 242 (which may be similar to the host 232 in FIG. 9) communicates, directly or via a network, with a rack system 244 in which multiple storage devices are stored. One such device is denoted at 246. It is contemplated that a copy of the state data under consideration is stored by the storage device 246. The associated data set described by the state data may also be stored on the storage device, or across other devices in the system.

The sequence in FIG. 10 is identified by a number of steps, and commences with (1) a request for a challenge value that is issued from the host device 242. The request may be directed to the storage device or to an authorization system 248 that includes the management circuit (234, FIG. 9) which in turn forwards the request to the storage device. In response, the data storage device (2) generates a challenge value which is (3) forwarded to the authorization system 248 by the host device 242.

The challenge value can be any suitable value generated for a particular authentication session. In some embodiments, the challenge value may be a random or pseudo-random sequence generated by the storage device. In other embodiments, the challenge value may be a concatenation of various values associated with the storage device. In some embodiments, the storage device may use a secret encryption key that is stored within a system on chip (SOC) device within the storage device electronics that cannot be accessed by an attacking party to encrypt an initial value to produce an encrypted value as the challenge value. In still other embodiments, private/public key encryption may be used.

The authorization system 248 may be a remote server or a local device that receives the challenge value, performs processing thereon, and produces (4) a response that is returned to the host device 242. In some embodiments, the challenge value may be digitally signed by the authorization system. In other embodiments, the challenge value may be encrypted (or decrypted) using one or more encryption keys. Generally, the response is designed to signify to the storage device that the requesting party has the right to take the requested action.

At step (5), an authentication value is forwarded by the host 242 back to the storage device. The authentication value may be the response value or may be another value generated responsive to the response value. At this point the storage device receives a response to the challenge value and performs internal processing to validate the response. As noted above, in one case the storage device may generate a sequence that is encrypted by the authorization system and returned in encrypted form using a secret key only known to the storage device and the authorization system. By decrypting the response to receive the originally generated challenge value, the storage device can confirm that the host had the proper credentials to access the authorization system. Other forms of authentication are well known in the art and can be used.

Regardless, once the authentication is successfully completed, the storage data operates to (6) transfer the requested state data to the host device 242. As desired, (7) data operations are carried out involving the associated data set.

In this way, information associated with a given data set is not made available to an outside party unless the outside party can provide sufficient credentials that the party is the owner of the data or otherwise has rights of access to the data. Information leakage channels regarding the data, by way of the control data (parametric values), is thereby reduced.

Figure 11:
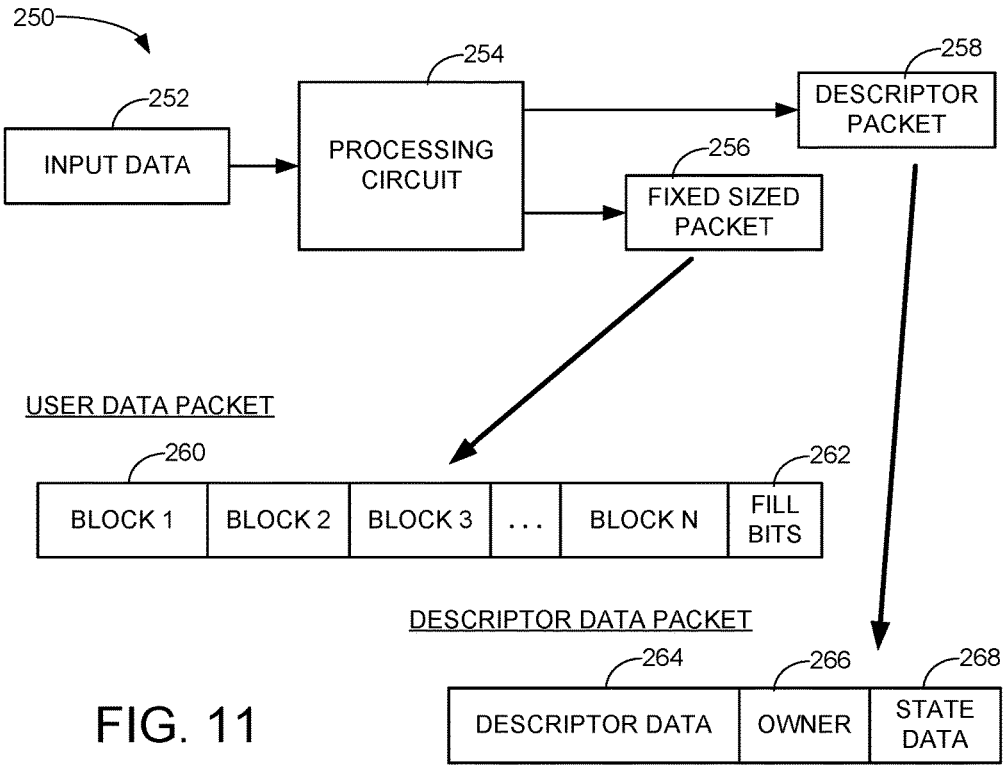
FIG. 11 shows a processing circuit that arranges multiple blocks of compressed and encrypted data into a fixed sized data packet and generates a corresponding descriptor packet in accordance with further embodiments.

FIG. 11 shows another arrangement of a data security system 250 that can be utilized in accordance with some embodiments. A processing circuit 254 receives input data from an input data source 252. As discussed previously, the processing circuit can comprise a controller circuit of a data storage device (e.g., the controller circuit 112 in FIG. 2, the controller circuit 154 in FIG. 3, etc.) or another processing circuit associated with one or more data storage devices (e.g., a storage server processor, etc.).

The processing circuit 254 operates to apply encoding, compression and encryption as discussed above to the input data. This produces a fixed sized user data packet 256 which is stored in a suitable memory location. The processing circuit 254 further operates to concurrently generate a descriptor data packet 258 which is also stored in a suitable memory location. As shown in FIG. 11, the user data packet 256 may be formed by concatenation of multiple blocks 260 of the user data. Because data compression tends to provide a variable compressed block length, a number of fixed sized input user blocks (such as 512 bytes, 4096 bytes, etc.) can be individually compressed and squeezed into the larger user data packet 256. In some cases, fill bits 262 may be appended at the end of the packet 256 to bring the total size of the compressed data packet up to a selected size (e.g., 128 KB; 1 MB, etc.).

The descriptor data packet 258 can also take a variety of forms, and may include descriptor data 264 to describe the associated user data packet 256, an owner identification (ID) value 266 identifying the owner(s) of the data, and a state data block 268 that stores information relating to the user data packet. In some cases, the state data block 268 may store the kinds of state data discussed above in FIG. 8. As desired, the descriptor data packet 258 may be encrypted or otherwise protected using a suitable data security scheme.

Access to the descriptor data packet is restricted as discussed above and is not released to a requesting party unless an authorization process such as shown in FIG. 10 is performed. Internal data transfers will generally tend to require access to the descriptor data packet in order to facilitate relocation of the user data packet 256 from a first location to a second location. In some cases, data transfer history data can be appended to the descriptor data packet to show the provenance of the data.

Figure 12:
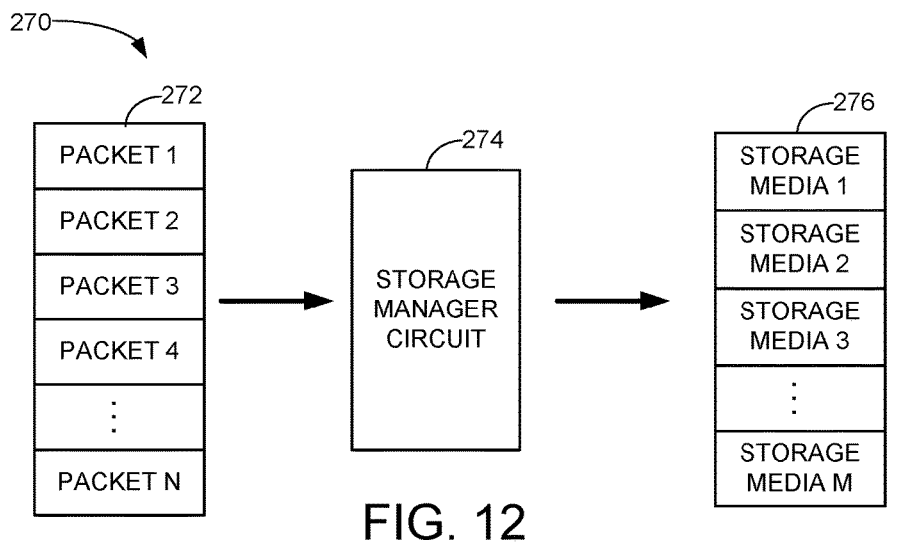
FIG. 12 illustrates a storage manager circuit adapted to store packets from FIG. 11 across multiple storage media in accordance with further embodiments.

FIG. 12 is a functional block representation of a data security system 270 operative in accordance with some embodiments. Packets 272, which may take the form of user data packets 256 and descriptor data packets 258 from FIG. 11, are presented to a storage manager circuit 274 which places such into various storage media locations 276.

It is contemplated that the storage manager circuit 274 has the necessary credentials to access and modify, as required, the descriptor data packets 258 (FIG. 11) as data are transferred through the system. Access to the contents of the descriptor data packets by outside parties, however, requires authentication that may be handled directly by the storage manager circuit 274 or indirectly via a separate authorization system (e.g., 248, FIG. 10) prior to releasing of the data to the requesting party. In some cases, the descriptor data packets 258 may be stored in a separate volume formed within the storage media 276 that requires outside access authentication.

It can now be seen that the various embodiments set forth herein provide a number of benefits over the art. By restricting access to the state parameter values (e.g., the control data as represented in FIGS. 8 and 11), information leakage channels can be minimized, reducing the ability of an attacking party from gaining knowledge associated with an associated data set.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A computer implemented method comprising:
receiving input data from a host into a buffer memory;
applying data compression to the input data to provide compressed data;
encrypting the compressed data using an encryption key to generate encrypted data;
storing the encrypted data in a first location of a main memory of a data storage device;
generating and storing, in a second access controlled location of the main memory, a system parameter value associated with the storage of the encrypted data, the system parameter value being a parameter value of a data storage system that includes the main memory and a controller circuit that performs the encrypting and storing, the system parameter value encrypted prior to storage thereof in the second access controlled location of the main memory;
establishing a trusted relationship to authenticate the host responsive to a request for the system parameter value, the trusted relationship established using a challenge value; and transferring, from the data storage device to the host, the system parameter value from the second access controlled location of the main memory responsive to the established trusted relationship.

2. The method of claim 1, wherein the system parameter value indicates available free space of the main memory after storing the encrypted data.

3. The method of claim 1, wherein the data compression is lossy data compression.

4. The method of claim 1, wherein the system parameter value is stored to the main memory of the data storage device and associated with the encrypted data.

5. The method of claim 1, wherein the system parameter value indicates a compression parameter associated with the compression of the input data.

6. The method of claim 5, wherein the compression parameter indicates a size of the compressed data.

7. The method of claim 1, further comprising generating metadata linking logical addressing to physical addressing associated with the storage of the encrypted data and storing the metadata in the second access controlled location of the main memory of the data storage device.

8. The method of claim 1, wherein receiving input data comprises receiving multiple blocks of input data, wherein applying data compression comprises individually compressing each of the multiple blocks, the method further comprising concatenating the multiple compressed blocks into a fixed sized data packet, and wherein encrypting comprises encrypting the concatenated fixed size data packet.

9. The method of claim 1, wherein the data storage device is characterized as a solid state drive (SSD).

10. The method of claim 1, wherein the data storage device is characterized as a hard disc drive (HDD).

11. A data storage device comprising:
a non-volatile main memory; and
a controller circuit configured to receive input data from a host into a buffer memory, apply data compression to the input data to provide compressed data, encrypt the compressed data using an encryption key to generate encrypted data, store the encrypted data in a first location of the main memory, generate and store in a second access controlled location of the main memory a system parameter value associated with the storage of the encrypted data, establish a trusted relationship to authenticate the host responsive to a request for the system parameter value, and transfer the updated system parameter value from the second access controlled location of the main memory to the host responsive to the established trusted relationship, the system parameter value being a parameter value of the data storage device, the system parameter value indicating a compression parameter associated with the compression of the input data, the system parameter value encrypted by the controller circuit prior to storage thereof in the second access controlled location of the main memory, the trusted relationship established using a challenge value.

12. The data storage device of claim 11, wherein the controller circuit is further configured to encrypt the system parameter value.

13. The data storage device of claim 11, characterized as a solid state drive (SSD).

14. The data storage device of claim 11, characterized as a hard disc drive (HDD).

15. The data storage device of claim 11, characterized as a hybrid data storage device (HDSD) so that the non-volatile main memory comprises both rotatable magnetic recording media and solid-state semiconductor memory.

16. The data storage device of claim 11, wherein the controller circuit is further configured to receive multiple blocks of input data, to apply data compression individually to each of the multiple blocks and to concatenate the multiple compressed blocks into a fixed sized data packet, and to encrypt the compressed data by encrypting the fixed size data packet.

17. An apparatus comprising:
a plurality of data storage devices arranged to form a multi-device memory space; and
a controller circuit configured to transfer data between the memory space and a host device by applying data compression to input data received from the host to provide compressed data, encrypting the compressed data using an encryption key to generate encrypted data, storing the encrypted data in a first location of a main memory, and generating and storing in a second access controlled location of the main memory a system parameter value associated with the storage of the encrypted data, the controller circuit further configured to, responsive to a request from the host for the system parameter value, establish a trusted relationship with the host and to transfer the system parameter value from the second access controlled location of the main memory to the host responsive to the established trusted relationship, the controller circuit encrypting the system parameter value prior to storage thereof in the second access controlled location of the main memory, the trusted relationship established using a challenge value.

18. The apparatus of claim 17, wherein the system parameter value relates to the application of data compression to the input data.

* * * * *